(12) United States Patent
Kemp et al.

(10) Patent No.: US 7,921,067 B2
(45) Date of Patent: Apr. 5, 2011

(54) METHOD AND DEVICE FOR MOOD DETECTION

(75) Inventors: Thomas Kemp, Esslingen (DE); Marta Tolos-Rigueiro, Vilassar de Mar (ES)

(73) Assignee: Sony Deutschland GmbH, Berlin (DE)

( * ) Notice: Subject to any disclaimer, the term of this patent is extended or adjusted under 35 U.S.C. 154(b) by 799 days.

(21) Appl. No.: 11/764,617

(22) Filed: Jun. 18, 2007
(Under 37 CFR 1.47)

(65) Prior Publication Data
US 2008/0201370 A1    Aug. 21, 2008

(30) Foreign Application Priority Data
Sep. 4, 2006  (EP) .................................... 06120077

(51) Int. Cl.
*G06F 15/18* (2006.01)
(52) U.S. Cl. .............................. 706/14; 706/45; 707/734
(58) Field of Classification Search .................... 706/25, 706/11, 14, 20, 45; 84/600, 611, 609, 612, 84/616, 668; 707/999.005, 734
See application file for complete search history.

(56) References Cited

U.S. PATENT DOCUMENTS

| | | | |
|---|---|---|---|
| 5,722,418 A | 3/1998 | Bro | |
| 6,160,986 A | 12/2000 | Gabai et al. | |
| 6,539,395 B1 * | 3/2003 | Gjerdingen et al. | 1/1 |
| 6,708,205 B2 | 3/2004 | Sheldon et al. | |
| 6,721,706 B1 | 4/2004 | Strubbe et al. | |
| 6,721,741 B1 | 4/2004 | Eyal et al. | |
| 6,728,679 B1 | 4/2004 | Strubbe et al. | |
| 6,731,307 B1 | 5/2004 | Strubbe et al. | |
| 6,735,628 B2 | 5/2004 | Eyal | |
| 6,748,395 B1 | 6/2004 | Picker et al. | |
| 6,751,614 B1 | 6/2004 | Rao | |
| 6,773,344 B1 | 8/2004 | Gabai et al. | |
| 6,794,567 B2 * | 9/2004 | Hughes et al. | 84/609 |
| 6,795,808 B1 | 9/2004 | Strubbe et al. | |
| 6,798,898 B1 | 9/2004 | Fedorovskaya et al. | |
| 6,834,195 B2 | 12/2004 | Brandenberg et al. | |
| 6,850,252 B1 | 2/2005 | Hoffberg | |
| 6,904,408 B1 | 6/2005 | McCarthy et al. | |
| 7,003,515 B1 * | 2/2006 | Glaser et al. | 707/723 |
| 7,582,823 B2 * | 9/2009 | Kim et al. | 84/600 |
| 2002/0128033 A1 | 9/2002 | Burgess | |
| 2003/0028498 A1 | 2/2003 | Hayes-Roth | |

(Continued)

FOREIGN PATENT DOCUMENTS
EP     1 170 722 A1     1/2002
(Continued)

OTHER PUBLICATIONS
U.S. Appl. No. 12/369,352, filed Feb. 11, 2009, Kemp.
(Continued)

*Primary Examiner* — Michael B. Holmes
*Assistant Examiner* — David H Kim
(74) *Attorney, Agent, or Firm* — Oblon, Spivak, McClelland, Maier & Neustadt, L.L.P.

(57) ABSTRACT

A method for mood detection, comprising receiving audio data, determining a mood for the audio data based on at least one mood model, receiving user feedback of a user for the determined mood, the user feedback being on a gradual scale and indicative as to whether the determined mood corresponds to a perceived mood of the user for the audio data, and adapting the mood model based on the user feedback.

16 Claims, 6 Drawing Sheets

U.S. PATENT DOCUMENTS

| | | |
|---|---|---|
| 2003/0059750 A1 | 3/2003 | Bindler et al. |
| 2003/0059780 A1 | 3/2003 | Ashkenazi et al. |
| 2003/0063072 A1 | 4/2003 | Brandenberg et al. |
| 2003/0131355 A1 | 7/2003 | Berenson et al. |
| 2003/0174830 A1 | 9/2003 | Boyer et al. |
| 2003/0175667 A1 | 9/2003 | Fitzsimmons, Jr. |
| 2003/0177017 A1 | 9/2003 | Boyer et al. |
| 2003/0191816 A1 | 10/2003 | Landress et al. |
| 2003/0229537 A1 | 12/2003 | Dunning et al. |
| 2003/0229900 A1 | 12/2003 | Reisman |
| 2003/0237093 A1 | 12/2003 | Marsh |
| 2004/0006476 A1 | 1/2004 | Chiu |
| 2004/0031058 A1 | 2/2004 | Reisman |
| 2004/0032393 A1 | 2/2004 | Brandenberg et al. |
| 2004/0034286 A1 | 2/2004 | Kasper et al. |
| 2004/0103160 A1 | 5/2004 | Sheldon et al. |
| 2004/0158494 A1 | 8/2004 | Suthar |
| 2004/0177096 A1 | 9/2004 | Eyal et al. |
| 2004/0199657 A1 | 10/2004 | Eyal et al. |
| 2004/0210533 A1 | 10/2004 | Picker et al. |
| 2004/0225499 A1 | 11/2004 | Wang et al. |
| 2004/0237759 A1* | 12/2004 | Bill ............................ 84/668 |
| 2004/0243567 A1 | 12/2004 | Levy |
| 2004/0243592 A1 | 12/2004 | Bill |
| 2004/0254809 A1 | 12/2004 | Teicher |
| 2004/0254957 A1 | 12/2004 | Hyotyniemi et al. |
| 2005/0015451 A1 | 1/2005 | Sheldon et al. |
| 2005/0043060 A1 | 2/2005 | Brandenberg et al. |
| 2005/0054381 A1 | 3/2005 | Lee et al. |
| 2005/0080673 A1 | 4/2005 | Picker et al. |
| 2005/0091156 A1 | 4/2005 | Hailwood et al. |
| 2005/0113650 A1 | 5/2005 | Pacione et al. |
| 2005/0114759 A1 | 5/2005 | Williams et al. |
| 2005/0117527 A1 | 6/2005 | Williams et al. |
| 2005/0137466 A1 | 6/2005 | Somov et al. |
| 2005/0143138 A1 | 6/2005 | Lee et al. |
| 2005/0163865 A1 | 7/2005 | Bieser et al. |
| 2005/0211071 A1* | 9/2005 | Lu et al. ...................... 84/611 |
| 2006/0054007 A1* | 3/2006 | Lu et al. ...................... 84/611 |
| 2006/0107823 A1* | 5/2006 | Platt et al. .................... 84/616 |
| 2007/0107584 A1* | 5/2007 | Kim et al. ..................... 84/612 |
| 2007/0113724 A1* | 5/2007 | Kim et al. ..................... 84/609 |
| 2007/0131095 A1* | 6/2007 | Park et al. .................... 84/609 |
| 2007/0131096 A1* | 6/2007 | Lu et al. ...................... 84/611 |
| 2007/0169613 A1* | 7/2007 | Kim et al. ..................... 84/609 |
| 2007/0174274 A1* | 7/2007 | Kim et al. ..................... 707/5 |
| 2008/0022844 A1* | 1/2008 | Poliner et al. ................. 84/609 |

FOREIGN PATENT DOCUMENTS

| | | |
|---|---|---|
| EP | 1 522 918 A2 | 4/2005 |
| EP | 1 522 920 A2 | 4/2005 |
| EP | 1 530 195 A2 | 5/2005 |
| GB | 2 402 779 A | 12/2004 |
| WO | WO 99/54015 A1 | 10/1999 |
| WO | WO 01/12285 A1 | 2/2001 |
| WO | WO 01/35667 A1 | 5/2001 |
| WO | WO 01/69799 A2 | 9/2001 |
| WO | WO 01/69829 A2 | 9/2001 |
| WO | WO 01/69830 A2 | 9/2001 |
| WO | WO 01/76120 A2 | 10/2001 |
| WO | WO 01/77952 A1 | 10/2001 |
| WO | WO 02/37249 A2 | 5/2002 |
| WO | WO 02/37250 A2 | 5/2002 |
| WO | WO 02/37472 A2 | 5/2002 |
| WO | WO 02/37474 A1 | 5/2002 |
| WO | WO 03/032226 A1 | 4/2003 |
| WO | WO 03/096669 A2 | 11/2003 |
| WO | WO 2004/075466 A2 | 9/2004 |
| WO | WO 2005/003899 A2 | 1/2005 |
| WO | WO 2005/006116 A2 | 1/2005 |
| WO | WO 2005/024649 A1 | 3/2005 |
| WO | WO 2005/025081 A1 | 3/2005 |
| WO | WO 2005/029242 A2 | 3/2005 |
| WO | WO 2005/043312 A2 | 5/2005 |
| WO | WO 2005/043313 A2 | 5/2005 |
| WO | WO 2005/053200 A2 | 6/2005 |
| WO | WO 2005/055802 A2 | 6/2005 |
| WO | WO 2005/113099 A2 | 12/2005 |

OTHER PUBLICATIONS

Muyuan Wang, et al., "User-Adaptive Music Emoition Recognition", ICSP'04 Proceedings, IEEE, Aug. 31, 2004, pp. 1352-1355, XP010810650.

Marta Tolos, et al., "Mood-based navigation through large collections of musical data", Consumer Communications and Networking Conference, IEEE, Jan. 3, 2005, pp. 71-75, XP010787613.

Billy Yapriady, et al., "Combining Demographic Data with Collaborative Filtering for Automatic Music Recommendation", Springer-Verlag, 2005, pp. 201-207, XP019015817.

Yazhong Feng, et al., "Music Information Retrieval by Detecting Mood via Computational Media Aesthetics", IEEE/WIC International Conference on Web Intelligence, Oct. 13, 2003, 7 Pages, XP010662937.

Oscar Celma, "Music Recommendation: A Multi-Facted Approach", Universitat Pompeu Fabra, Jul. 2006, pp. 8-47 and cover Page, XP002416340 <www.iua.upf.edu/mtg/publications/7126eb-DEA-2006-Celma.pdf>.

Dan Liu, et al., "Automatic Mood Detection from Acoustic Music Data", 2003, pp. 81-87.

U.S. Appl. No. 12/593,927, filed Sep. 30, 2009, Kemp.

* cited by examiner

(12) United States Patent

METHOD AND DEVICE FOR MOOD DETECTION

FIELD OF THE INVENTION

The invention relates to a method for mood detection and to a device for a mood detection.

BACKGROUND OF INVENTION

With today's large capacity MP3 players there is a substantial need for an easy method to navigate inside of large musical collections. There exist algorithms to generate a playlist for a user, wherein songs are selected or grouped that may correspond to the user's taste. Mood is known to be a very important criterion based on which people select songs they would like to listen to. Therefore, mood-based selection algorithms, i.e. the creation of playlists based on the mood of songs can be very powerful.

However, for mood-based selection of songs it is crucial that the mood of a song, i.e. audio data, may be detected as reliable as possible.

It is an object of the invention to provide a method for mood detection and a device for mood detection enabling mood detection/classification of audio data at a low error rate.

SUMMARY OF THE INVENTION

In order to solve the above object, a method for mood detection is provided comprising: receiving audio data, determining a mood, in the following also referred to as determined mood or automatically detected mood, for said audio data based on at least one mood model, receiving user feedback of a user for said determined mood, said user feedback being indicative as to whether said determined mood corresponds to a perceived mood of said user for said audio data, and adapting said mood model based on said user feedback. Thus, a personalized mood model is determined for said user.

An example of a mood model may e.g. be a mood model for the mood "happy" or "romantic". Therefore, in general there are as many mood models as moods shall be detected by the method/device.

Said user feedback may in a very simple form be only a yes/no decision stating that the user agrees to the determined mood (determined mood corresponds to perceived mood) or not (determined mood does not correspond to perceived mood). Of course, the feedback may also be given on a gradual scale. This may be helpful because often users may not be sure if the determined mood corresponds to their perceived mood completely or to a lesser extend.

The adapting of said mood model may comprise modifying or changing said mood model or parameters thereof and/or transforming said mood model and/or parameters thereof.

Said method may comprise determining new training data for said mood model based on said user feedback, and adapting said mood model based on said new training data. Thus, additional training data is collected during usage of a system in which said mood model or method for mood detection is integrated by exploiting the user feedback. It should be noted that said mood model is previously trained using predetermined training data and some kind of learning algorithm. A mood model thereby may correspond to one specific mood of audio data, e.g. "happy" or "sad". When determining a mood model for e.g. "happy" than the system is previously trained with training data comprising audio data that was previously hand-labeled as "happy".

Said adapting of said mood model may also comprise modifying said mood model or parameters thereof based on said user feedback. Thus, the mood model or parameters thereof obtained during previous training sessions may be changed based on new training data.

Said adapting may also comprise re-training said mood model based on said new training data. Re-training means to calculate, i.e. determine a new mood model, i.e. new parameters based on new training data using some kind of learning algorithm. In other words, the previous mood models may be exchanged with new mood models trained on the new training data. The learning algorithm need not be the same as used in previous training sessions. As learning algorithm, maximum likelihood estimation may be used.

Said adapting may also comprise transforming said mood model based on said user feedback. In this case the mood model or parameters thereof may not be changed, but instead are transformed using some kind of transformation. For example, a linear transformation may be applied which is determined based on said new training data. In other words, the mood model is updated in an indirect way. For example, for an existing model for e.g. "happy" a linear transformation is determined and optimized that maximizes the likelihood of the audio data (e.g. a song) given the transformed model for "happy". Thus, a transformation is determined or found such that after applying the transformation the transformed model for "happy" fits best (constraint by the transformation and the initial mood model for "happy") to the hand-labeled song, i.e. new training data or previously obtained training data. In general, there should be one song per mood class, i.e. mood model, available in the hand-labeled set. "Hand-labeled" means that audio data was classified by the user to correspond to a certain mood. In this case, the linear transformation is sought to maximize the total likelihood of all hand-labeled songs if evaluated by their respective adapted class models (e.g. a happy song by the model for "happy" and a sad song by the model for "sad", etc.). This determined linear transformation is then applied to all models. By doing so, the relative location of the initial models to each other in the mood space can be kept, while the model set as a whole is adapted towards the musical taste of a given user.

Said adapting may also comprise modifying said mood model in dependence of corresponding mood models for other users. For example, a mood model for "happy" of another user may be used for adapting the mood model for "happy" of said user. In this case the other users may be chosen based on similar or same musical taste, i.e. similar users, to the user for which the mood model shall be adapted.

Said method may also comprise assigning said user to a predetermined group of users, determining or receiving a union mood model which corresponds to a mood model for said group of users and using said union mood model as mood model for determining said mood. Said union mood model may be determined by merging or combining mood models of users belonging to a certain group of users. One possibility to obtain a union mood model for a certain mood is to concatenate all songs corresponding to the corresponding mood. In other words, all songs of users of the same group, said songs being labeled with the same mood, are merged into one supersong, i.e. a very long song comprising all corresponding songs. From this supersong, a new union mood model is derived, i.e. trained.

When determining or receiving a union mood model it is not necessary to obtain user feedback. Thus, a personalized mood model (union mood model) may be obtained without user feedback based on the mood models of other users.

Said user may be assigned to said group of users based on collaborative filtering algorithms.

Said group of users may comprise or consist of users having a similar taste of music as said user. Therefore, said union mood model may depend on mood models of users having a similar or same musical taste.

Said similar taste of different users may be determined by comparing a music collection of said user with music collections of other users. This is e.g. useful when a user uses a system on which he may download a number of audio data or songs selected by himself. Other users may also download certain songs corresponding to their taste. Thus, the music collection corresponding to the downloaded or stored songs of particular users may be compared and the similar music taste of the different users is determined based on the similarity of their music collection.

Also, said group of users may comprise or consist of users having similar perception of mood for the same song. If e.g. different users have all labeled a certain song with the same mood, i.e. the different users have given feedback with respect to the same song, then it is assumed that these users have the same perception of mood. It is also possible to determine the mean similarity between first songs of a first user and second songs of a second user, wherein said first songs and said second songs are labeled with the same mood.

Said group of users may also comprise or consist of users from the same geographic location and/or having the same ethnical background. Often, people from different geographic locations or from different ethnical background have a different perception of the mood of music. For example, a person from Asia may consider a certain song to be "happy" whereas a person from Europe may consider such a song as "sad" or vice versa.

Said method may also comprise a step of determining or selecting an initial mood model as mood model, which initial mood model corresponds to a mood model of users from the same geographic location and/or having the same ethnical background. Thus, the mood model initialization may be performed in dependence of the geographic location and/or ethnical background of the user. The initial mood model may be determined or selected based on the geographical region where the method/system is used. It is thereby possible to choose mood seed audio data used for the model computation in dependence of the geographical location/region where the method/system is to be used. "Mood seed audio data" means audio data that is typically associated with a certain mood within a certain geographical location. For example the song "Love me tender" by Elvis Presley is typically considered to be "romantic" by people from Europe, i.e. the song "Love me tender" may be used as mood seed audio data for determining the mood model for "romantic". Using mood seed audio data selected in dependence of the geographic location may therefore be used for determining an initial mood model. The initial mood model may then be adapted during usage of the system as explained above.

The device for mood detection comprises: receiving means adapted for receiving audio data, mood classification means for determining a mood for said audio data based on at least one mood model, feedback means for obtaining user feedback of a user for said determined mood, said user feedback being indicative as to whether said determined mood corresponds to a perceived mood of said user for said audio data, and mood adaptation means for adapting said mood model based on said user feedback. Said feedback means may e.g. be realized as two buttons, a first button indicating that the user agrees to the automatically determined mood, and a second button indicating that the user does not agree to the automatically detected mood.

Further, a signal processing system is provided, which is capable of performing a method for mood detection as defined above and/or the steps thereof.

Also, a computer program product is provided, comprising computer program means adapted to perform and/or to realize a method of mood detection as defined above and/or the steps thereof, when it is executed on a computer, a digital signal processing means, and/or the like.

Additionally, a computer readable storage medium is provided, comprising a computer program product as defined above.

It is important to note that all embodiments, examples or details mentioned in conjunction with the method for mood detection may be applied in an analogous way to said device or mood detection or vice versa. Also, all different aspects or details as set out above and further elucidated below might be combined in any way.

The accompanying drawings, which constitute a part of the specification, illustrate an exemplary embodiment of the invention, and, together with a general description of the invention given above, and the detailed description of the embodiments given below, serve to explain the principle of the invention, wherein:

BRIEF DESCRIPTION OF THE DRAWINGS

In FIG. 1 audio data 1 is received by a mood classification means 2. Said mood classification means 2 may e.g. be a signal processing means, personal computer, PDA or the like and be based on a known algorithm for mood detection like e.g. "Automatic Mood Detection from Acoustic Music Data" by Liu et al., Proceedings of ISMIR 2003, Baltimore. The mood detection algorithm is trained prior to mood classification. Thereby, mood models 8-1 to 8-3 are trained or determined. In the example of FIG. 1 there are three mood models. A first mood model 8-1 for the mood "happy", a second mood model for "sad" and a third mood model for "romantic".

Figure 1:
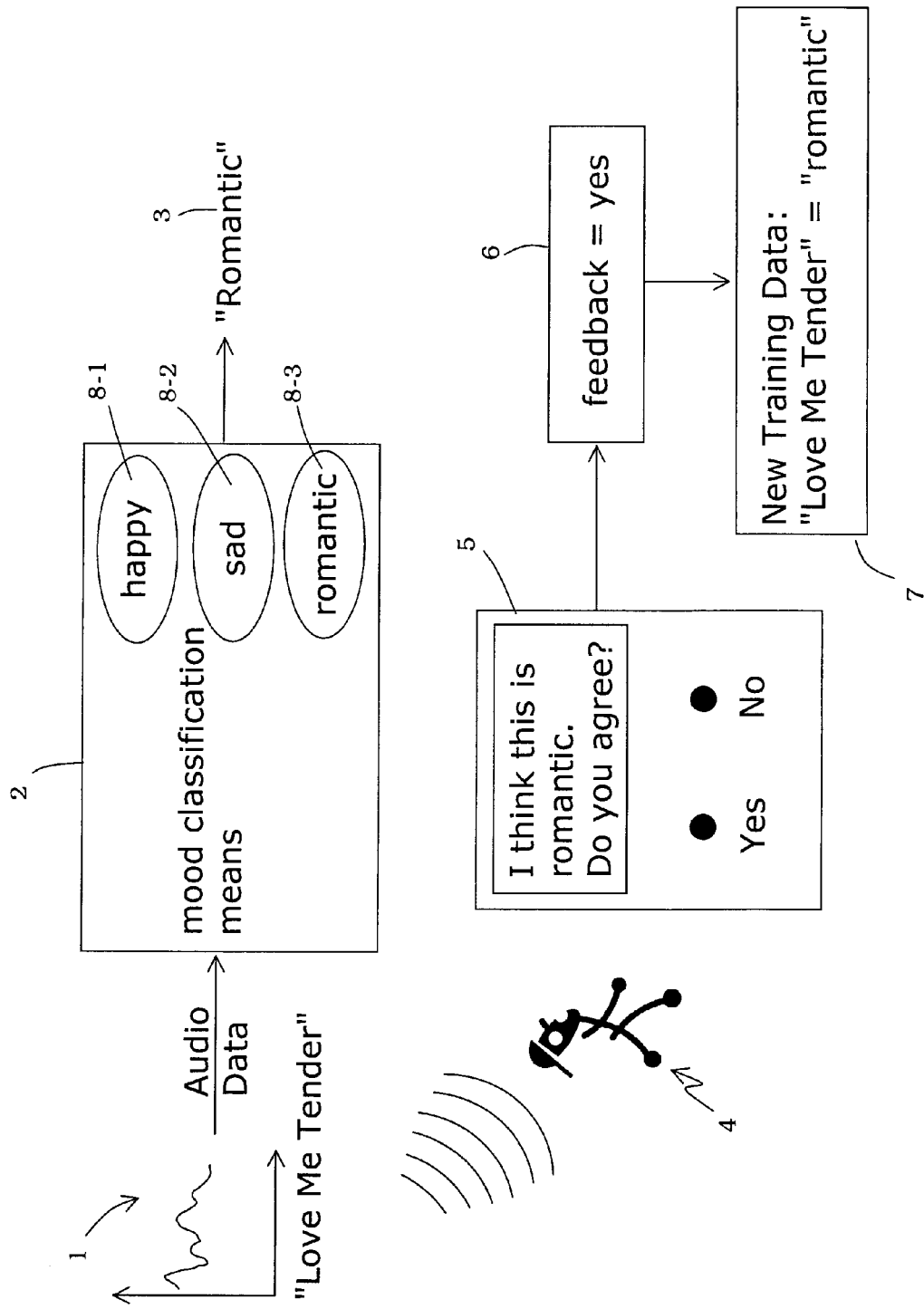
FIG. 1 shows how user feedback may be obtained.

In the example of FIG. 1, said audio data 1 corresponds to a song "Love me tender" by Elvis Presley. Said mood classification means 2 determines the mood for said audio data 1. In the example of FIG. 1, the determined mood 3 is "romantic".

When a user 4 listens to the song "Love me tender", a feedback means 5 may be used for obtaining user feedback regarding the determined mood 3 of the audio data 1. Therefore, said feedback means 5 may display to the user 4 a question like e.g. "I think this is romantic. Do you agree?" There may be buttons provided on said feedback means 5, i.e. a YES-button and a NO-button.

In the example of FIG. 1, the user 4 agrees to the determined mood 3, i.e. the user 4 considers the song "Love me tender" corresponding to said audio data 1 to be "romantic". In the example of FIG. 1, the user feedback 6 is therefore "yes".

Based on the user feedback 6, new training data 7 is determined. In the example, the new training data consists of "Love me tender"="romantic". As will be explained later, this new training data is used for adapting said third mood model 8-3 corresponding to a mood for the mood "romantic".

Figure 2:
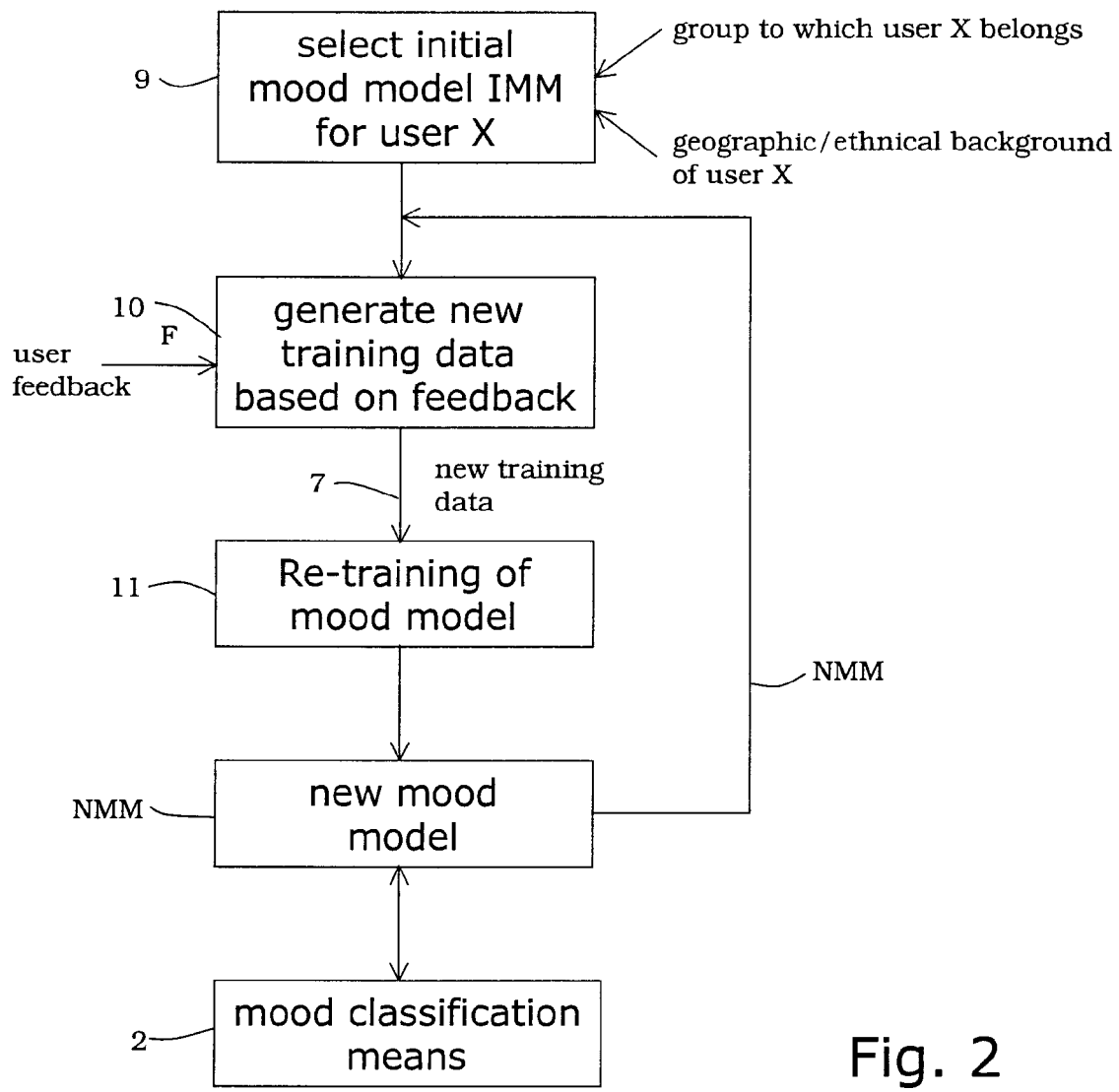
FIG. 2 shows adaptation of mood models based on re-training.

In FIG. 2, an initial mood model IMM is determined for user X in an initial mood model selection step 9. Said initial mood model IMM may be chosen depending on a group of users to which the user X belongs to. For example, groups of users may be determined with respect to a homogeneous mood of the group or with a homogeneous music taste. In other words, the initial mood model of user X may be chosen depending on similar music taste, perceived mood or other similarities between user X and other users.

It is also possible that the initial mood model is determined based on the geographic location or ethnical background of user X. If e.g. said mood classification means is integrated in a system that is determined to be sold in Europe, then one or more initial mood models may be chosen that are suitable for Europe. It is also possible that only certain initial mood models are chosen in the described way whereas other mood models are globally the same. This is e.g. useful if a certain mood is perceived in a similar way in different regions whereas another mood is perceived completely different.

In a next step, i.e. a training data generation step 10, new training data is determined based on feedback that is received from the user as previously explained. The new training data 7 is then used in a re-training step 11. Within said retraining step 11, the mood models are modified, i.e. the parameters of the models are changed by using some kind of learning algorithm, for example an algorithm as described in "automatic mood detection from acoustic music data" by Liu et al., Proceedings of ISMIR 2003, Baltimore, may be re-applied using the new training data.

The output of the re-training step 11 is a new mood model NMM, i.e. an adapted mood model, which may then be used for further mood detection/classification by the mood classification means 2. Subsequently, the new mood model NMM may again be adapted by modifying the new mood model NMM when new user feedback/training data becomes available. Of course it is possible that said retraining step 11 is not immediately performed but only after a predetermined number of feedback sessions leading to a set of new training data. Therefore, new training data may be collected and stored which corresponds to a predetermined number of feedback obtained for different audio data, e.g. songs. Then, the retraining step 11 is performed for all of the stored new training data.

Figure 3:
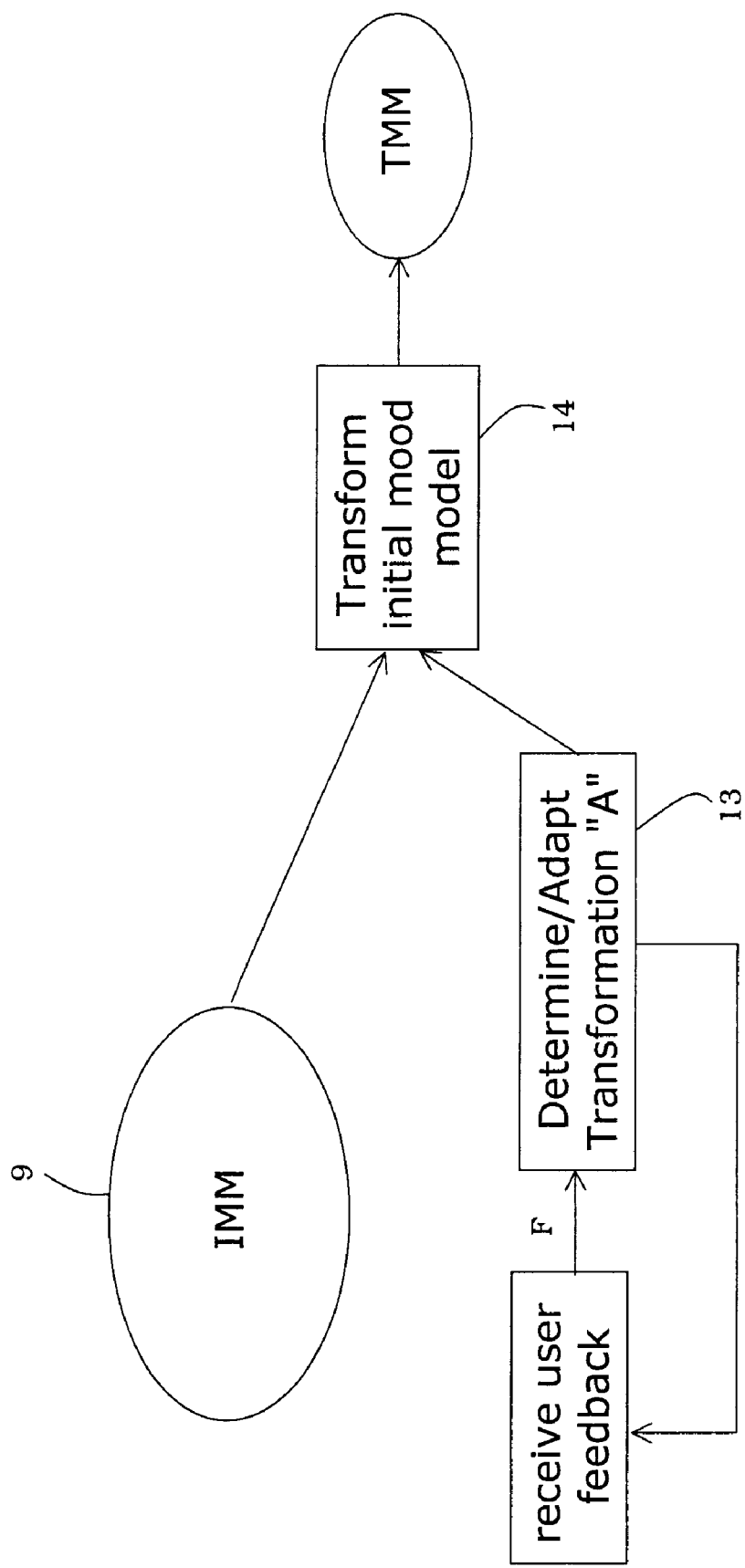
FIG. 3 shows adaptation of mood models based on a transformation.

FIG. 3 shows how the initial mood model IMM that may be determined as previously explained may also be adapted. The adaptation explained in connection with FIG. 3 may be performed independently from the re-training explained in connection with FIG. 2 or in addition to the re-training.

In a transformation determining step 13, a transformation A is determined based on user feedback F. It is also possible that said transformation A be adapted based on user feedback/new training data, i.e. user feedback/new training data is used to refine or adapt the transformation A.

Then, in a transformation step 14, the initial mood model IMM is transformed applying the transformation A which was determined in said transformation determining step 13. The result is a transformed mood model TMM which can be further used for mood classification within said mood classification means 2.

Figure 4:
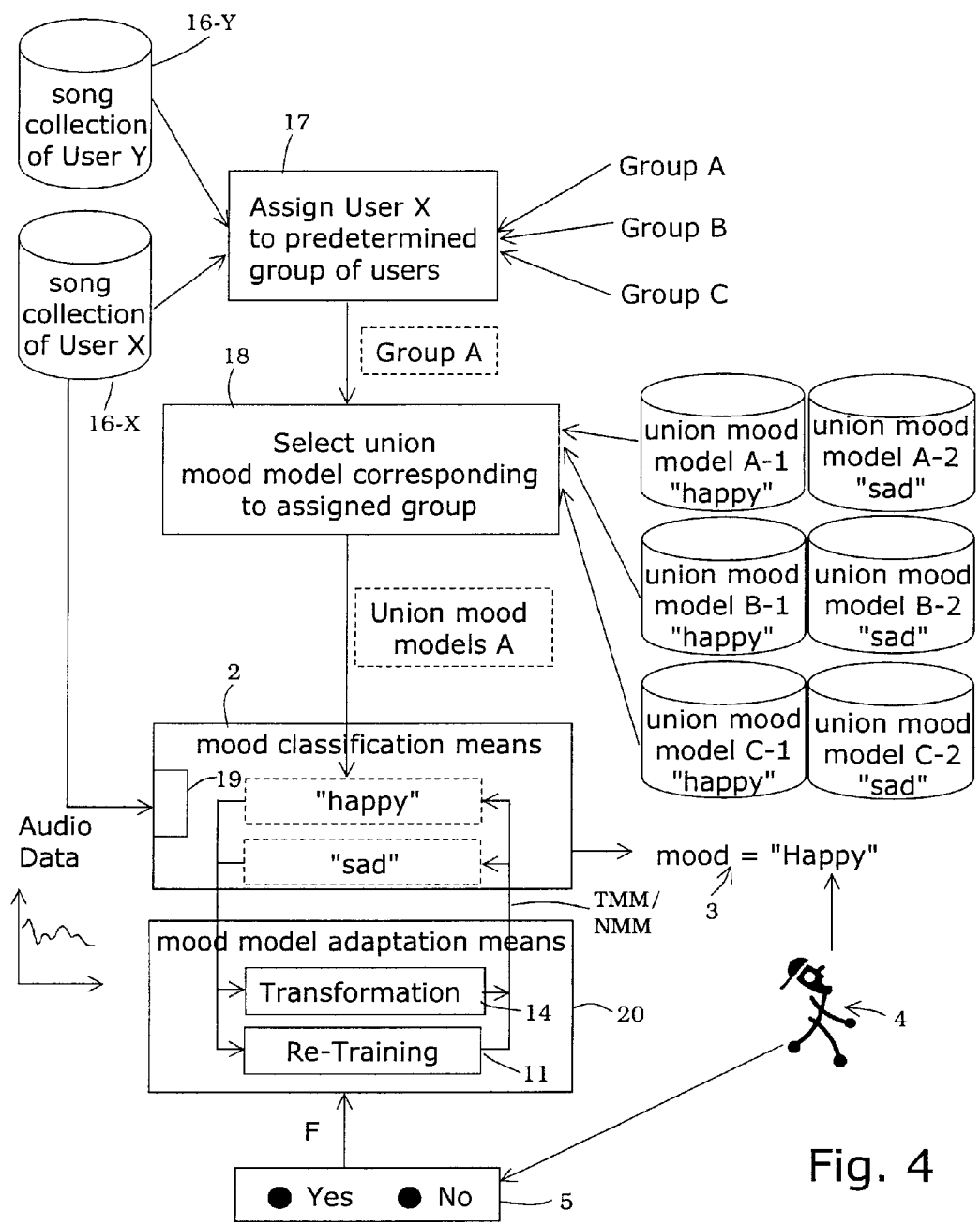
FIG. 4 shows how union mood models may be applied.

FIG. 4 shows how a mood model may be adapted based on mood models of other users. Of course, the steps explained at hand of FIG. 4 may be applied also for selecting/determining an initial mood model IMM.

In a group assigning step 17, the user X is assigned to a predetermined group of users, e.g. group A, group B or group C. In order to assign the user X to one of the groups, a song collection 16-X of user X is compared with a song collection 16-Y of user Y. In the example of FIG. 4, the user Y may have a similar song collection 16-Y as the user X. Further, the user Y is a user of group A. Therefore the user X is assigned to group A within said group assigning step 17.

Then, within a union model selection step 18, a union mood model is selected that corresponds to the group to which the user X was assigned to, in the example group A. Therefore, union mood models A-1 and A-2 are selected. It is important to note that for each mood to be determined/classified, one union mood model is selected. Therefore, if e.g. the system shall only discriminate between mood="happy" and mood="sad", then two union mood models A-1 and A-2 are selected, i.e. a union mood model A-1 for "happy" and a union mood model A-2 for "sad".

The selected union mood models A-1, A-2 are then used for mood classification within said mood classification means 2.

Using said mood classification means 2, it is possible to determine the moods of all of the songs of the song collection 16-X of user X. Therefore, a receiving means 19 receives audio data corresponding to the different songs in the collection of user X and said mood classification means 2 determines the mood 3 for each song.

While listening to a song of said song collection 16-X the user X may give user feedback F using said feedback means 5. The user feedback F may then be used for transforming the mood models used for mood classification within a mood model adaptation means 20 in order to obtain said transformed mood model TMM. It is also possible that said mood model adaptation means 20 determines new training data based on said feedback F as explained above and then re-trains the model as explained above. In this case a new mood model NMM is obtained which is then used by said mood classification means 2 in order to classify further audio data 2.

Figure 5:
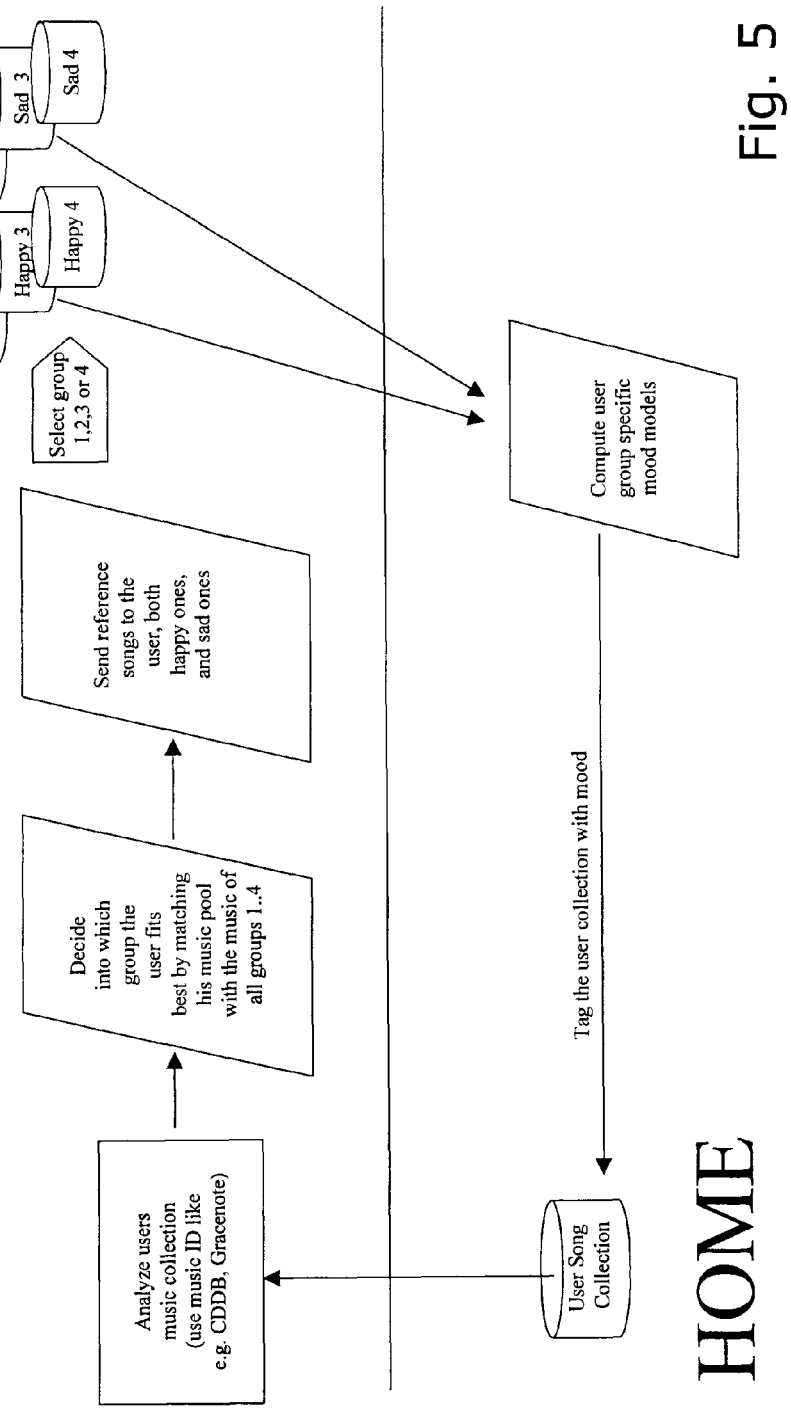
FIG. 5 shows a server based method for a mood model initialization.

FIG. 5 illustrates how a user's song collection is analyzed using a media file recognition, categorization and organization tool such as Gracenote MusicID®.

After analyzing the user's music collection, it is decided into which group the user fits best by matching his music pool, i.e. his song collection with the music of all groups 1 . . . 4. Then, reference songs are sent to the user both, happy ones and sad ones. By doing so, feedback of the user may be obtained.

In order to obtain an initial mood model a union mood model corresponding to the mood model of the group to which the user has been assigned to is selected. In the example of FIG. 5, the user belongs to group 3 such that the corresponding mood model "happy" 3 and mood model "said" 3 is selected.

Based on the selected mood models, user group specific mood models may be determined. These are then used to tag the user's collection with mood.

Figure 6:
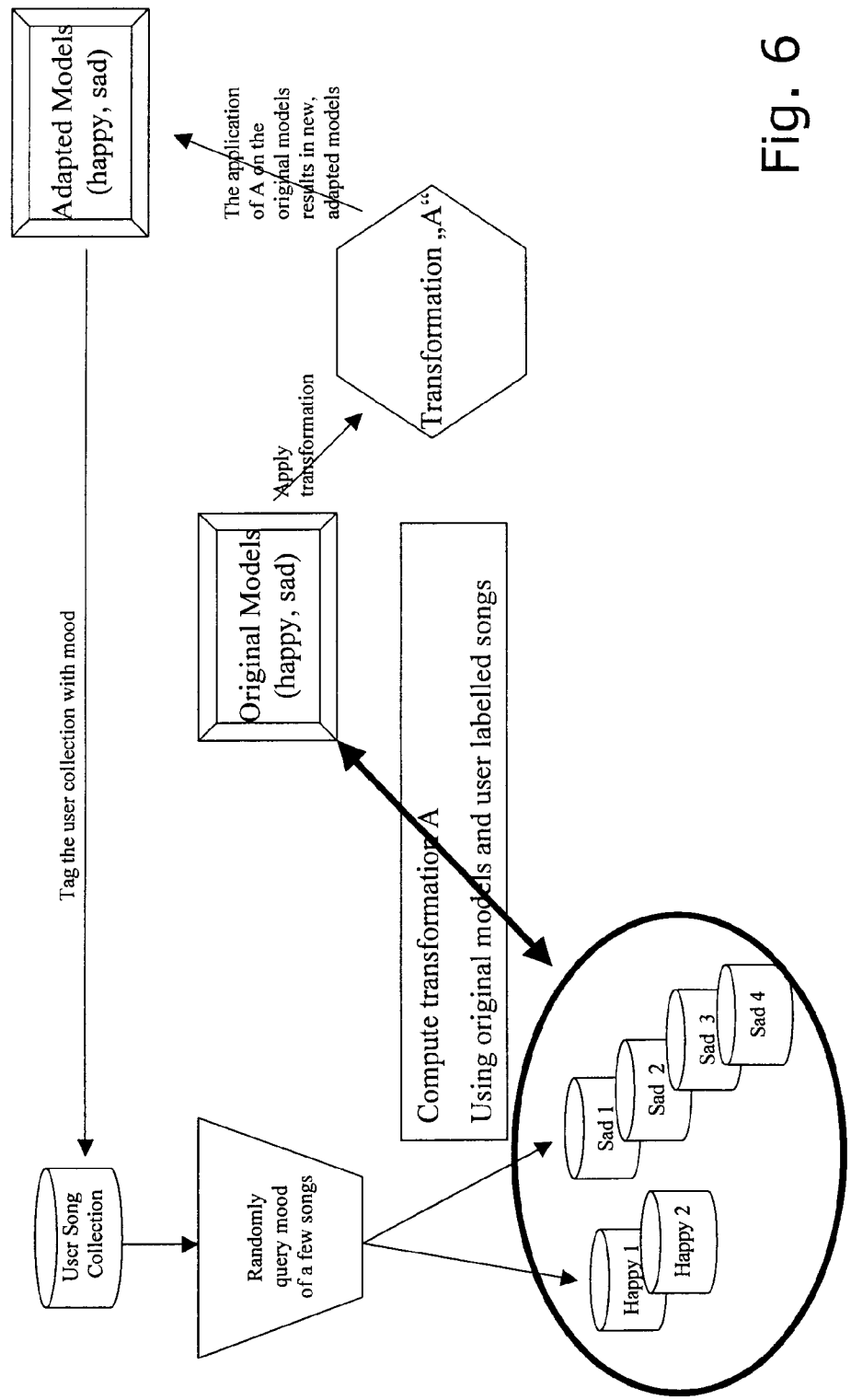
FIG. 6 shows an indirect way for mood model adaptation.

FIG. 6 illustrates how a transformation A is used for adapting mood models.

First, the mood of a few songs is queried randomly. The mood can be queried directly or indirectly. When querying the mood indirectly, the buttons on said feedback means 5 may be labeled with "yes, correct" and "no, in my view this is mood X". Then, a transformation A may be computed by using the original mood models and user labeled songs, i.e. songs for which feedback/new training data had been obtained previously. Then, the original models, in the example of FIG. 6, the models "happy" and "sad" are adapted by applying the transformation "A". The application of the transformation A on the original models results in new adapted models. The adapted models are then used to tag the user's collection with mood, i.e. to determine the mood for each or at least some of the songs of the user's song collection.

The following elucidations may help a person skilled in the art to get a better understanding of the invention or of its background.

Although the perceived mood is one of the most important selection criteria for music, according to user's studies, there is a substantial difficulty in exploiting this criterion for navigating large musical data bases: the subjective nature of the perceived mood. In order to have personalized mood models, however, a lot of practical difficulties are faced, namely the data collection problem. It is impractical and cumbersome to ask the user to provide a bunch of examples for each mood dimension, i.e. for each mood that the system needs to discriminate, i.e. classify.

Therefore, as described above, it is possible to obtain a personalized mood model in a non obtrusive way by a) initializing the mood models based on aa) culture and ab) implicit collaborative filtering, and then by b) adapting the initial mood model according to user feedback.

As may be apparent from the above, the mood map that underlies mood detection algorithms should not be a general one but a different one for each person, i.e. personalized mood models should be used. In general, using a user independent global mood map is unsatisfying for a lot of users. Therefore, in order to make mood based music selection useful, individual mood maps (and mood classifiers) are determined in a simple and non-intrusive way.

Another issue is that mood perception is culture-dependent. People from an Asian cultural background may have a significantly (p<0.07) different perception with respect to the quality dimension (positive/negative) in music than people from a European cultural background.

The underlying technology of music mood detection is one of classification. Based on a suitable preprocessing of the music, following established guidelines in the music information retrieval literature, as e.g. described in "Automatic Mood Detection from Acoustic Music Data" by Liu et al., Proceedings of ISMIR 2003, Baltimore, a set of models is created, with one model for each of the moods that need to be categorized afterwards. Each such model consists of a mixture of Gaussians with full, diagonal or no covariance model (where the mixture could also contain just one Gaussian), which in turn is computed from a set of music pieces that all fall into the given mood category. For mood classification, the unknown music piece is preprocessed and the preprocessed features are evaluated with all mood models. The best scoring mood model, or the set of all scores from all mood models, is used to further allow a mood based navigation in the music space.

The basic idea of personalizing the mood computation can be grouped into two distinct steps:
a) initial model creation (model initialization)
b) Model adaptation of the properly initialized models, following user usage feedback.

For initial mood model creation, i.e. for determining an initial mood model IMM, the following steps may be performed:
aa) initialize the mood models (or equivalently, choose the mood seed songs for the model computation) according to the geographical region where the system is used. This means, that the mood seed is different in Asia as compared to Europe, since the average music mood perception differs between cultures.
ab) scan through the users database of music and identify the titles the user owns or has downloaded or has somehow indicated to like. This allows drawing conclusions with respect to his musical taste, by looking up—very much like collaborative filtering—other users that have similar collections. With the assumption that other users having similar collections have similar understandings of mood, the room of all possible music mood spaces can be further subdivided and the user specific mood models can be constructed from a union of all music mood models of similar users (similar defined by having the same songs in the collection) and the geographical region based initial music pool.

This process may be done before the user uses the system the first time, i.e. in initialization.

During usage, the user is periodically asked for feedback regarding the mood of the songs he is listening to. E.g. the system confronts the user with the statement: "I think this is a happy song—what do you think?" If the user answers, this information is stored, and used to update the mood models in the following way.
a) direct way. The user-categorized song, i.e. a song for which the user gave his/her feedback, is directly put into the respective mood song training pool, i.e. new training data is obtained for the respective mood. E.g. if the user says that "Stairway to heaven" is happy, this song is put into the mood training pool for the mood model "happy".
b) indirect way. For the existing model for "happy", a linear transformation is sought and optimized, that maximizes the likelihood of the song given the trans-formed "happy" model. I.e., a transformation is found such that after applying the transformation, the transformed happy model fits in the best possible way (constrained by the transformation and the initial happy model) to the hand-labeled song, i.e. the song for which user feedback was obtained. In general, there should be one song per mood class available in the hand-labeled set. In this case, the linear transform is sought to maximize the total likelihood of all hand-labeled songs if evaluated by their respective adapted class models (e.g. a happy song by the happy model, a sad song by the sad model, etc). This linear transform is then applied to all models. By doing so, the relative location of the initial models to each other in the mood space can be kept, while the model set as a whole is adapted towards the musical taste of a given user.

| Reference List | |
|---|---|
| NMM | new model based |
| IMM | initial mood model |
| TMM | transformed mood model |
| 1 | audio data |
| 2 | mood classification means |
| 3 | determined mood |
| 4 | user |
| 5 | feedback means |
| 6 | user feedback |
| 7 | new training data |
| 8 | mood model |
| 9 | initial model based selection step |
| 10 | training data generation step |
| 11 | re-training step |
| 13 | transformation determining step |
| 14 | transformation step |
| 15 | transformed model based |
| 16 | song collection |
| 17 | group assigning step |
| 18 | union model selection step |
| 19 | receiving means |
| 20 | mood model adaptation means |

The invention claimed is:

1. A method for mood detection using a mood detection device having a processor comprising:
   receiving audio data;
   assigning a user to a predetermined group of users;
   determining, using the mood detection device, a mood for said audio data based on at least one mood model, wherein said determining includes determining or receiving a union mood model, which corresponds to a mood model for said predetermined group of users, and using said union mood model as mood model for determining said mood;
   communicating the determined mood to the user;
   thereafter, receiving user feedback of the user for said determined mood, said user feedback being on a gradual scale and indicative as to whether said determined mood corresponds to a perceived mood of said user for said audio data; and
   adapting said mood model based on said user feedback.

2. The method according to claim 1, further comprising:
   determining new training data for said mood model based on said user feedback; and
   adapting said mood model based on said new training data.

3. The method according to claim 1, wherein said adapting comprises modifying said mood model based on said user feedback.

4. The method according to claim 2, wherein said adapting comprises re-training said mood model based on said new training data.

5. The method according to claim 1, wherein said adapting comprises transforming said mood model based on said user feedback.

6. The method according to claim 5, wherein said transforming said mood model comprises applying a linear transformation, wherein said linear transformation is determined based on said new training data.

7. The method according to claim 1, wherein said adapting comprises modifying said mood model according to corresponding mood models of other users.

8. The method according to claim 1, wherein said user is assigned to said predetermined group of users based on collaborative filtering algorithms.

9. The method according to claim 1, wherein said predetermined group of users comprises of users having a similar taste of music as said user.

10. The method according to claim 9, wherein said similar taste is determined by comparing a music collection of said user with music collections of other users of said predetermined group of users.

11. The method according to claim 1, wherein said predetermined group of users comprises or consists of users having similar perception of mood for a song.

12. The method according to claim 1, wherein said predetermined group of users comprises or consists of users from a same geographic location and/or having a same ethnic background.

13. The method according to claim 1, further comprising determining or selecting an initial mood model as mood model, said initial mood model corresponding to a mood model of users from a same geographic location and/or having a same ethnic background.

14. A device for mood detection, comprising:
    receiving means for receiving audio data;
    assigning means for assigning a user to a predetermined group of users;
    mood classification means for determining a mood for said audio data based on at least one mood model, wherein determining includes determining or receiving a union mood model, which corresponds to a mood model for said predetermined group of users, and using said union mood model as mood model for determining said mood;
    communication means for communicating said determined mood to the user;
    feedback means for thereafter obtaining user feedback of said user for said determined mood, said user feedback being on a gradual scale and indicative as to whether said determined mood corresponds to a perceived mood of said user for said audio data; and
    mood adaptation means for adapting said mood model based on said user feedback.

15. A non-transitory computer readable storage medium having encoded thereon a program that, when executed on a computer, causes the computer to perform a method of mood detection comprising:
    receiving audio data;
    assigning a user to a predetermined group of users;
    determining a mood for said audio data based on at least one mood model, wherein the determining includes determining or receiving a union mood model, which corresponds to a mood model for said predetermined group of users, and using said union mood model as mood model for determining said mood;
    communicating the determined mood to the user;
    thereafter, receiving user feedback of the user for said determined mood, said user feedback being on a gradual scale and indicative as to whether said determined mood corresponds to a perceived mood of said user for said audio data; and
    adapting said mood model based on said user feedback.

16. A system for mood detection, comprising: a receiving device configured to receive audio data;
    an assigning device configured to assign a user to a predetermined group of users;
    a mood classification device configured to determine a mood for said audio data based on at least one mood model by determining or receiving a union mood model, which corresponds to a mood model for said predetermined group of users, and using said union mood model as mood model for determining said mood;
    a communication device configured to communicate said determined mood to a user;
    a feedback device configured to thereafter obtain user feedback of said user for said determined mood, said user feedback being on a gradual scale and indicative as to whether said determined mood corresponds to a perceived mood of said user for said audio data; and
    a mood adaptation device configured to adapt said mood model based on said user feedback.

* * * * *